United States Patent [19]
Faulkner et al.

[11] Patent Number: 5,153,764
[45] Date of Patent: Oct. 6, 1992

[54] CONTROL OF OPTICAL SYSTEMS

[75] Inventors: David W. Faulkner; Dianne M. Russ, both of Ipswich; David I. Fordham, Saxmundham; Alistair Hutcheon, Ipswich; Ian D. Henning, Ipswich, all of England

[73] Assignee: British Telecommunications public limited company, Great Britain

[21] Appl. No.: 314,761

[22] PCT Filed: May 6, 1988

[86] PCT No.: PCT/GB88/00356
§ 371 Date: Feb. 2, 1989
§ 102(e) Date: Feb. 2, 1989

[87] PCT Pub. No.: WO88/09093
PCT Pub. Date: Nov. 17, 1988

[30] Foreign Application Priority Data
May 6, 1987 [GB] United Kingdom ............. 8710736
Nov. 20, 1987 [GB] United Kingdom ............. 8727259

[51] Int. Cl.$^5$ .............................................. H04J 14/08
[52] U.S. Cl. ..................................... 359/136; 359/135; 359/167
[58] Field of Search ................. 455/607, 612, 69, 606, 455/617; 370/4, 13, 14, 17, 15; 359/135, 136–137, 152, 167, 177

[56] References Cited

U.S. PATENT DOCUMENTS

| | | | |
|---|---|---|---|
| 3,732,496 | 5/1973 | Boyer | 455/69 |
| 4,317,232 | 2/1982 | Pickett et al. | 455/606 |
| 4,512,033 | 4/1985 | Schrock | 455/69 |
| 4,553,268 | 11/1985 | Tilly | 455/607 |
| 4,580,262 | 4/1986 | Naylor et al. | 455/69 |

FOREIGN PATENT DOCUMENTS

| | | |
|---|---|---|
| 0138365 | 4/1985 | European Pat. Off. |
| 0162994 | 12/1985 | European Pat. Off. |
| 0168051 | 1/1986 | European Pat. Off. |
| 3314869 | 10/1984 | Fed. Rep. of Germany |
| 2568431 | 1/1986 | France |

OTHER PUBLICATIONS

Alping et al., Electronics Letters, vol. 20, No. 19, Sep. 13, 1984, pp. 794–795.
Milcom '85, Conference Record of the 1985 IEEE Military Communications Conference, Oct. 20–23, 1985, Boston, vol. 2, IEEE, (New York, U.S.).
C. Topolcic et al.: "The SATNET monitoring system", pp. 468–476 see p. 469, right-hand column, lines 1–3; p. 473, left-hand column, lines 3–5.
Patent Abstracts of Japan, vol. 10, No. 263 (E–435)(2319), Sep. 9, 1986, & JP, A, 6189735 (Nippon Telegr. & Teleph. Corp.) May 7, 1986.
"Time Division Direction Control Transmission System of Optical Communication System"–Nippon Telegr & Teleph Corp. vol. 10 No. 263 (E–435) [2319] Sep. 9, 1986.

Primary Examiner—Edward L. Coles, Sr.
Assistant Examiner—Kinfe-Michael Negash
Attorney, Agent, or Firm—Nixon & Vanderhye

[57] ABSTRACT

A method and control system for controlling a signal from each outstation in a multiple access passive optical network including a central node and a plurality of outstations involves monitoring, at the exchange, the value of a parameter of a signal from reach outstation. The value of the parameter is monitored relative to a predetermined discrimination value to detect the signal relative to predetermined first and second reference values defining a range of acceptable values for the parameter. If the value of the parameter for a detected signal falls outside the range, a control signal is transmitted from the node to instruct the relevant outstation to alter the value of the parameter as required to bring the value into the acceptable range for subsequent signals originating from that outstation. The method and system are particularly adapted for controlling the temporal position and the amplitude of outstation signals in a TDM passive optical network. A transceiver for use with such a system is also disclosed.

25 Claims, 5 Drawing Sheets

DIAGRAM OF SYSTEM

CONTROL OF OPTICAL SYSTEMS

The present invention relates to a method of control of an optical system a signal control system and a transceiver for use in such a control system and in particular for use with multiple access optical networks.

The use of a multiple access network allows for potentially highly efficient use of network resources. More expensive equipment for network management, for example, may be located at a central node, or exchange and its facilities shared by a large number of individual network outstations. In such circumstances the exchange may be connected via a single main line with branch feeder lines linking the network outstations to the main line. In an optical network the branching may conveniently be effected by passive optical splitters. It is therefore feasible to produce a multiple access optical network with no active components other than at the exchange and at the outstations themselves. The advantages of such a passive network include easier maintenance and reduced overall cost.

In a multiple access network it is necessary to ensure that signals intended for, or originating from, a particular outstation are correctly identifiable. The technique of Wavelength Division Multiplexing (WDM) or Time Division Multiplexing (TDM), for example, enable this identification to be achieved.

Where TDM is used, each outstation is allocated an individual time slot or channel specifically for reception or transmission of its own signals. When a composite TDM signal is broadcast from the exchange each outstation will receive the whole of that signal from which it selects and decodes its own allocated channel. However, in the reverse direction, each outstation contributes its own signal alone and the network itself must effectively assemble all the separately originating channels into a composite TDM signal for passing back to the exchange in the correct order. The outstations are generally irregularly spaced at different distances from the exchange. It is therefore essential to provide some method of ensuring that transmissions from each outstation occupy a designated time slot in the assembled return signal irrespective of the physical position of the outstation relative to the exchange, both at the time of connection to the network and at all subsequent times.

To deal with this problem a ranging protocol may be employed. Ranging protocols are known for use in radio networks and will not be further discussed here. However, it has been found that provision of a conventional ranging protocol is not necessarily sufficient to ensure the accurate assembly of the return TDM signal in a passive optical network as described above. Localised variations can occur in the transmission path, for example, such that the words or bits in a signal originating from an outstation may not be exactly within the boundaries of the allocated time slot in the return TDM signal. The signal from one outstation may then overlap the signal from another to the detriment of the network efficiency.

A further problem arises because the amplitude of the signals from each outstation depends on the power of the transmitter associated with the outstation and on the attenuation of the optical path from that outstation. Both these factors will vary from one outstation to another. Thus, unless compensating measures are taken, the composite return TDM signal may have signal levels which differ from one time slot to the next, according to whichever outstation each slot is allocated. Such a variable signal is difficult to demultiplex.

It is an object of the present invention to provide a method and apparatus controlling the signal transmission from network outstations in a multiple access passive optical network such that the aforementioned problems are substantially overcome or at least mitigated.

According to the present invention a method of controlling a signal from an outstation in a multiple access passive optical network including a central node and a plurality of outstations comprises, at the central node, monitoring the value of a parameter of the signal from the outstation relative to a predetermined discrimination value to detect the signal, further monitoring the value of the parameter of the signal from the outstation relative to predetermined first and second reference values defining a range of acceptable values for the parameter; and, if the value of said parameter for a detected signal falls outside the said range, transmitting a control signal to instruct the relevant outstation to alter the value of said parameter as required to bring said value into the acceptable range for subsequent signals originating from that outstation.

In a time division multiplex (TDM) optical network, the parameter is preferably the temporal position of the signal from an outstation in the allocated TDM time slot for that outstation. The first and second reference values are preferably chosen to define a central region within the total duration of the time slot.

Alternatively, or additionally in a second application of the method of the invention, the parameter may be the signal amplitude. In this instance, the discrimination value is a preset amplitude level. The first and second reference values are then preferably two further amplitude levels defining an acceptable amplitude range above the discrimination value.

The method of the invention provides a convenient technique for automatic signal control in a multiple access system. The problems noted above are thereby avoided without recourse to time-consuming individual calibration of each outstation at connection.

The method is particularly appropriate for use with TDM systems, but is also adaptable for use with wavelength division multiplex systems, for example, where the monitored parameter may conveniently be the individual signal wavelengths (or frequencies).

In a multiple access passive optical network including a central node and a plurality of outstations, a signal control system for implementing the method of the invention comprises, in the central node, decision means for detecting the signal from an outstation and monitoring the value of a parameter of the signal relative to a predetermined discrimination value; first and second monitoring means for comparing the value of a parameter relative to predetermined first and second respective reference values defining a range of acceptable values for the parameter; control means for identifying the outstation sending the signal and, if the value of the parameter for a detected signal falls outside the said range, for transmitting a control signal specific to that outstation, the control signal carrying instructions to the outstation to alter the value of the parameter as required to bring the value into the acceptable range for subsequent signals originating from that outstation; and, in an outstation, decoding means for identifying a control signal specific to the outstation and signal control means responsive to the control signal for altering the value of the monitored parameter as instructed.

Where the network is a TDM optical network, the parameter is preferably the temporal position of the signal as for the method. Preferably the monitoring means are adapted to monitor the signal position with respect to the time slot allocated to each particular signal.

Alternatively or additionally, the control system may be adapted to monitor the signal amplitude.

A control system according to the invention allows the problem of inter symbol interference (ISI) from spill-over of signals in adjacent time slots to be conveniently avoided.

A control system according to the invention also provides a means for introducing a network-wide automatic gain control facility into the network. Amplitude variations within the received multiplex at the central node may thereby be minimised.

In these circumstances, DC coupling in the central node receiver, which would otherwise be needed to maintain a given amplitude decision threshold (binary quantisation level) if the amplitudes were widely variable between signals, is not required. The performance of the exchange receiver may thereby be improved and the design simplified.

A standard transmitting laser has been found to detect signals in the above described receive mode at an error free 2.048 Mbit/s over 10 km of single-mode optical fibre. A better performance is to be expected if the laser/diode combination were optimised for use as a transceiver.

A control system according to the invention further permits the optical transmitter, usually a laser, in an outstation, to be operated at power levels which are effectively the minimum required for efficient operation of the network. Consequently, the reliability of the lasers will be increased to substantially the optimum possible within the network constraints.

Additionally, the control system allows the condition of the outstation transmitter to be easily assessed. For example, the control system may be adapted to recognise the occurrence of a consistent trend in the alteration of a monitored parameter and give an early warning of a fault state before actual failure.

According to another aspect of the present invention a transmitter/receiver (transceiver) for use with a signal control system according to the present invention includes an optical transmitter whose peak power output is controllable by the signal control means, the transmitter being also arranged to form at least part of an optical detector for detecting the control signals from the central node.

Preferably the transceiver includes a laser diode having a back-facet photodiode, and a laser bias supply whereby the laser diode is forward biased to act as laser amplifier when not in transmitting mode.

This has several advantages over systems using separate transmitters and receivers. The monitor diode supplied with commercially available laser transmitters which is redundant as a controller with the control system of the present invention when controlling the laser output is utilised in a manner which means the receiver package can be dispensed with. The need for a coupler of significant cost at the customer's end which was previously necessary to connect the receiver to the network is also removed. This reduces the costs of the customer service and reduces maintenance requirements.

The method of the invention and an embodiment of a control system and a transceiver all according to the invention will now be described in detail and by way of example with reference to the accompanying drawings in which.

Figure 1:
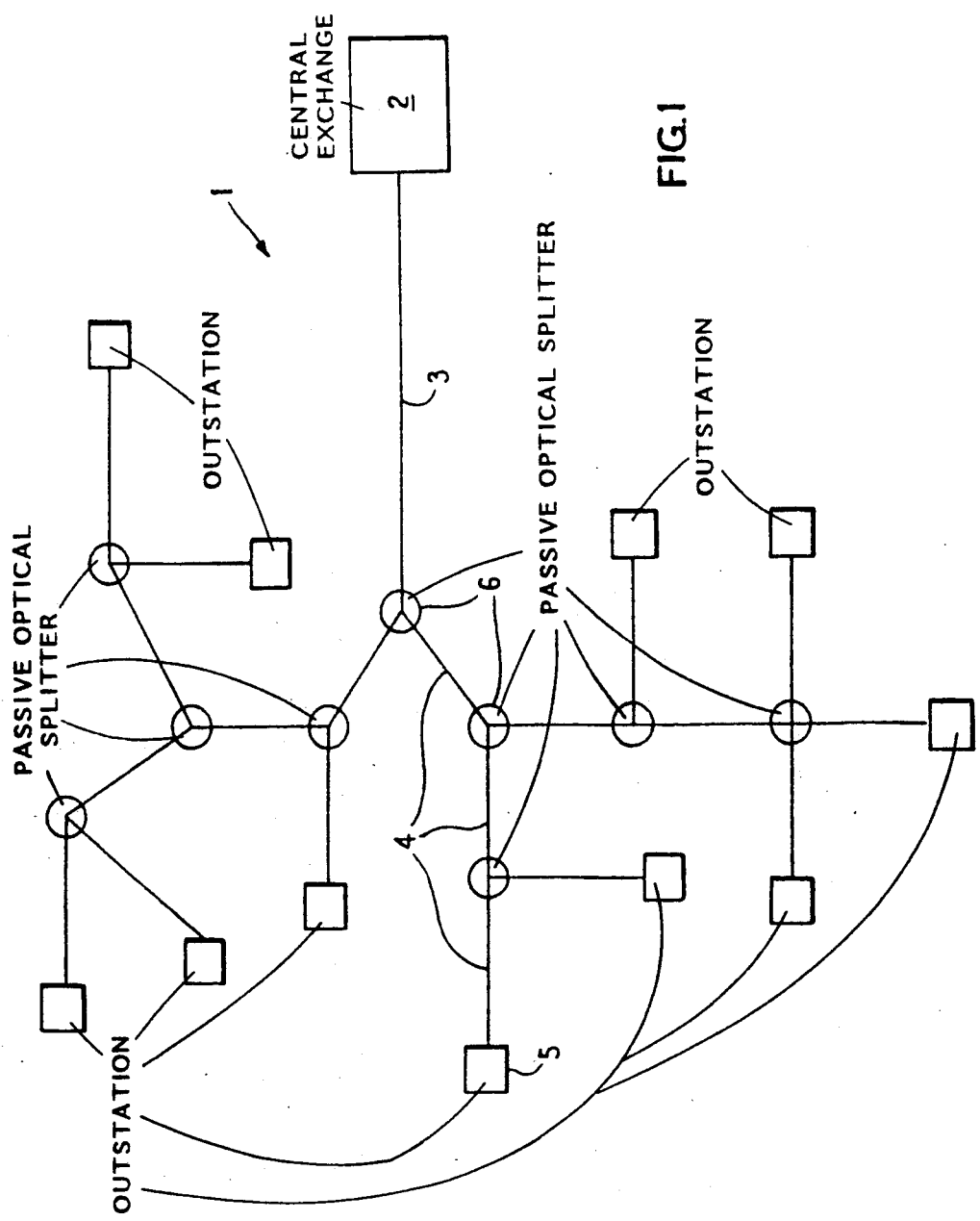
FIG. 1 illustrates schematically a multiple access passive optical network according to the present invention.

In FIG. 1, a multiple access passive optical network 1, in this case part of a telephone system, consists of a central exchange 2 connected to outstations 5 (shown as square boxes). From the exchange 2 a main optical fibre link 3 is successively branched at passive optical splitters 6 (shown circled) into branch optical fibre links 4 which ultimately link in to the individual outstations 5.

For TDM operation of the network 1 it is necessary to provide a method for synchronising the signals originating from the outstations such that these signals can be passively assembled by the network into the correct sequence for return to the exchange 2 via the main link 3. Coarse synchronism is provided by use of a suitable ranging protocol (not further described here) such as is known in radio networks.

Figure 2:
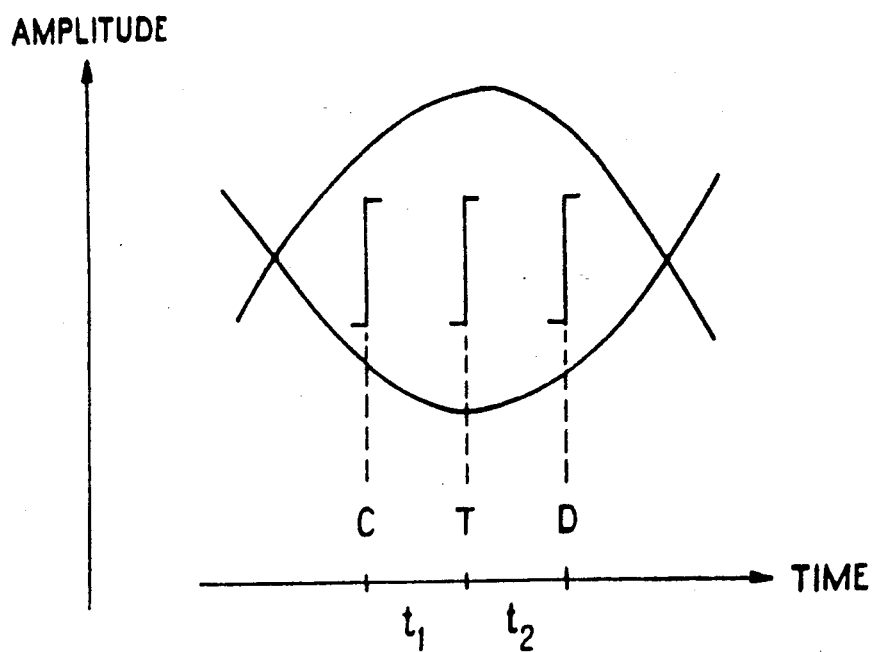
FIG. 2 illustrates an aspect of one implementation of the method according to the present invention.

Closer tolerances, as required in high bit-rate transmission, for example, may be obtained by using the method of the invention. A suitable adaptation of the technique is illustrated in FIG. 2. A signal received at the exchange is shown in the form of a conventional eye diagram. The central position for this signal which may be set by the ranging protocol, is indicated by T. For the normal purposes of information retrieval the signal is sampled at this instant. The signal is also monitored at two further sampling instants C and D at times $t_1$ and $t_2$ before and after T respectively.

A binary code word is then constructed according to the signal level monitored at each of these instants. The code word is then used to determine what timing adjustment, if any, is required. An appropriate logic table is given as Table 1.

TABLE 1

| | Binary levels for time slot (outstation)N | |
|---|---|---|
| C T D | Diagnosis | Action |
| 0 0 0 | Timing correct | None required |
| 1 1 1 | Timing correct | None required |
| 0 1 1 | Timing late | Reduce outstation N delay |
| 1 0 0 | Timing late | Reduce outstation N−1 delay |
| 1 1 0 | Timing early | Increase outstation N delay |
| 0 0 1 | Timing early | Increase outstation N+1 delay |
| 0 1 0 | Invalid | Code |
| 1 0 1 | Invalid | Code |

The exchange control system then transmits an addressed control signal instructing the relevant outstation to increment or decrement the signal delay as may be required. Addressing techniques for control signals are well known and will not be treated in detail here.

Figure 3:
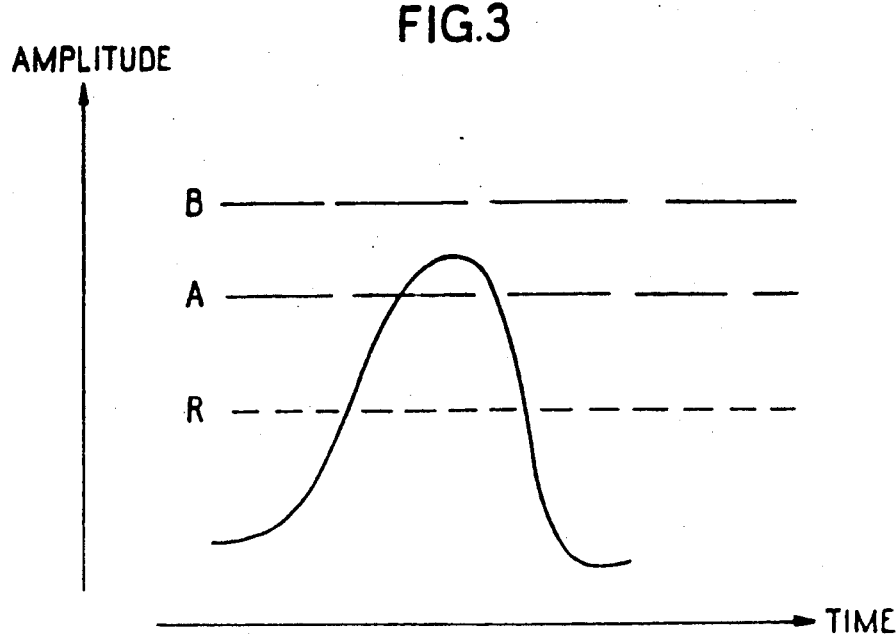
FIG. 3 illustrates an aspect of another implementation of the method.

The method of the invention may be similarly adapted for regulating signal amplitude as shown in FIG. 3.

In this case, the normal receiver decision threshold level, designated R, is used to distinguish between signal "ones" and "zeros". Two additional levels defining an acceptable amplitude range are also monitored. These levels' designated A and B, are monitored to detect when the signal level falls below an acceptable minimum or exceeds an acceptable maximum respectively. These levels are conveniently set according to the signal-to-noise ratio of the weakest outstation signal expected. Both levels are set about the discrimination threshold R to allow a safety margin between that threshold and the lower monitoring level A in order to reduce the risk that a signal will ever fall below the threshold and be entirely undetected. As previously, the signal level monitored in terms of the R, A, B levels is translated into a 3 bit binary code word which can be used to determine the required amplitude adjustment according to Table 2.

TABLE 2

| Binary levels R A B | Diagnosis | Action |
| --- | --- | --- |
| 0 0 0 | "Zero received | None |
| 1 1 0 | "One" received Amplitude acceptable | None |
| 1 1 1 | "One" received Amplitude excessive | Instruct outstation N to decrease transmitter power |
| 1 0 0 | "One" received - Amplitude too low | Instruct outstation N to increase transmitter power |
| 0 0 1 | Invalid code | |
| 0 1 0 | Invalid code | |
| 0 1 1 | Invalid code | |
| 1 0 1 | Invalid code | |

As described above the method for position control (FIG. 2) and for amplitude regulation (FIG. 3) may be implemented separately. However, the signal detection at T in the time slot and the amplitude measurement can be viewed as interdependent. Detection of a signal at T, for example depends on the signal amplitude exceeding the threshold R at that time. Furthermore, whereas it is possible to monitor the amplitude throughout the duration of the time slot and irrespective of whether or not the threshold R is exceeded at T, as a desirable alternative the amplitude measurement may itself be made dependent on the detection of a signal at time T. This latter strategy can avoid mistaken measurement of the amplitude of a signal overlapping from another time slot, for example for the purposes of analysis using Tables 1 and 2 the logical states for R and T are then identical for any given signal and may be determined together from a single measurement. The remaining variables A, B, C, D are determined individually as before.

Figure 4:
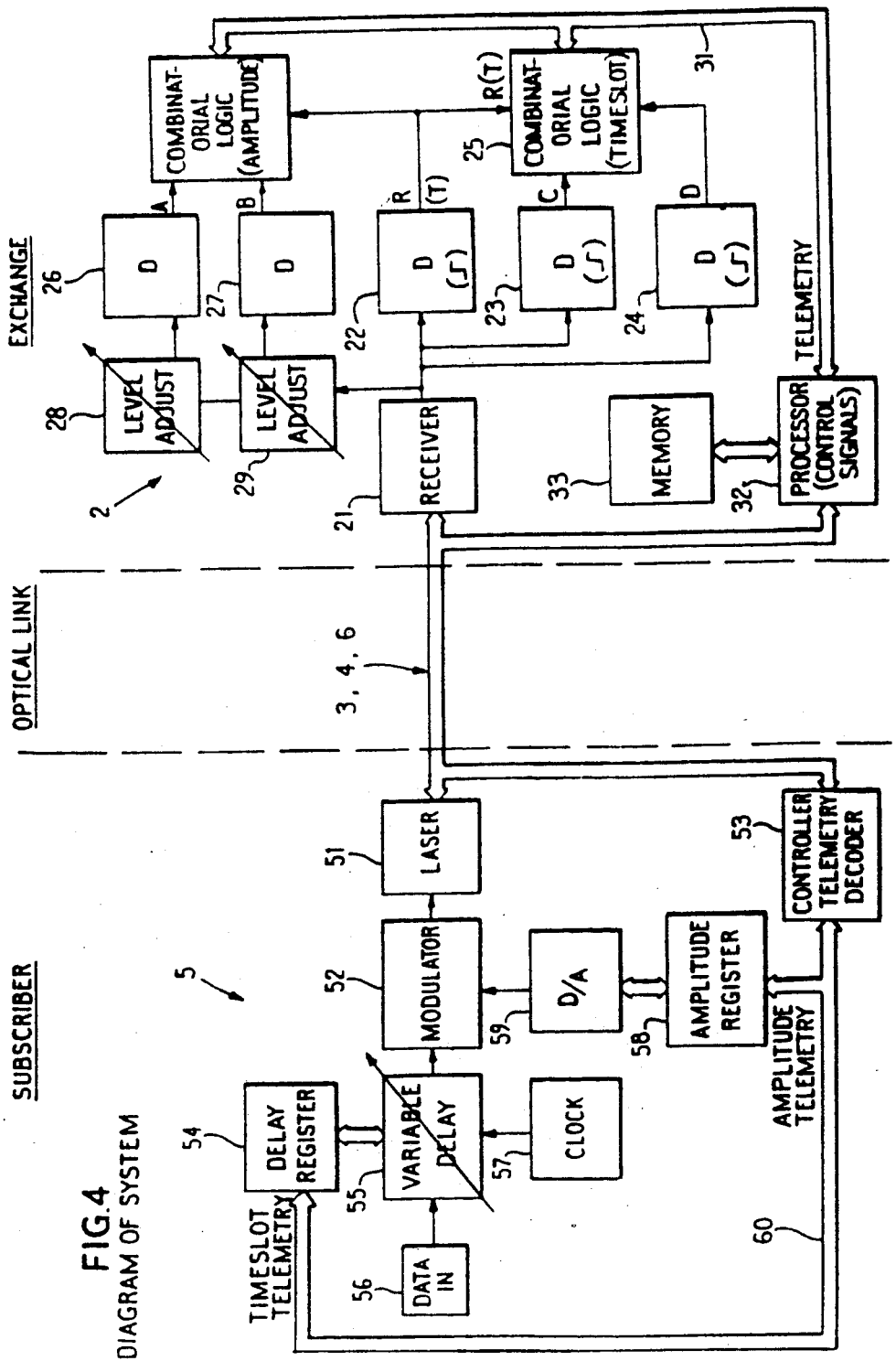
FIG. 4 is a schematic diagram of an embodiment of a control system according to the present invention.

A control system for a TDM multiple access passive optical network and combining position and amplitude control by the method of the invention is shown schematically in FIG. 4. For ease of illustration only the relevant components only of the exchange 2 and one outstation 5, connected by the passive network 3, 4, 6, are indicated in the Figure.

In the outstation 5, date from a data source 56 passes for return signal transmission to the exchange 2 by a laser 51 under control of a modulator 52. The return signal transmission is timed by a clock control which is is initially set by a ranging protocol as mentioned previously. A variable delay 55 allows fine-tuning of the timing according to the method of the present invention.

The return signal amplitude is adjusted using an amplitude control register 58 and digitial-to-analog converter 59 to control the drive current supplied by the modulator 52 to the laser 51.

In the exchange 2 the return signal arrives at the TDM receiver 21, which passes the signal, in its appropriate time slot, via five D-type flip-flops 22, 23, 24, 26, 27 which perform the signal position and amplitude monitoring functions as detailed below.

To monitor the signal position relative to the time slot the signal from the receiver 21 gated through the three D-types 22, 23, 24 is at the relevant times (cf. FIG. 2). Thus D-type 22 monitors the centre of the acceptable period within the time slot as defined by the gating of D-types 23 (for C) and 24 (for D). According to the states of these position D-types 22, 23, 24 the time slot combinatorial logic 25 then provides the appropriate code work (cf. Table 1) to the control bus 31.

The D-type 22 which monitors the central position of the signal within the time slot is set to trigger at the minimum signal discrimination threshold R. The state of this D-type therefore is also used to provide the base detection reference for the amplitude measurement.

The acceptable amplitude range (cf. FIG. 3) is determined by the two further D-types 26, (for A) and 27 (for B). The signal is proportionately attenuated by the level adjusters 28 and 29 before being applied to the D-types 26 and 27 respectively. Consequently these D-types will only be triggered by a signal whose amplitude exceeds the present higher levels A, B above the basic discrimination threshold R. The amplitude combinatorial logic 30 monitors the state of the relevant D-types 22, 26, 27 and provides the appropriate amplitude code word (cf. Table 2) to the control bus 31.

The code words for both position and amplitude are passed by the bus to the control processor 32 with associated memory 33. The processor 32 analyses the code words to determine the required action and generates a corresponding control signal which is then specifically addressed to the relevant outstations and transmitted accordingly.

In the outstation 5, a local controller 53 is provided with a telemetry decoder to check the addressing of any control signals arriving from the network and to identify and decode those intended for the particular outstation.

If the instructions in the control signal are to alter the timing of signal transmission, for example, the controller 53, via the local bus 60, increments or decrements the delay latch register 54 to vary the variable delay 55 as appropriate.

If the instructions are to alter the signal amplitude, the controller 53, again via the local bus 60, increments or decrements the amplitude latch register 58. The count in the amplitude register 58 is then converted via the D/A converter 59 in order to control the drive current supplied to the laser 51 by the modulator 52.

Although the method and control system of the present invention have been specifically described with reference to a TDM passive optical network, it will be appreciated that the application of the invention is not restricted. The principles of the invention may equally be applied, for example, to a WDM network.

Figure 5:
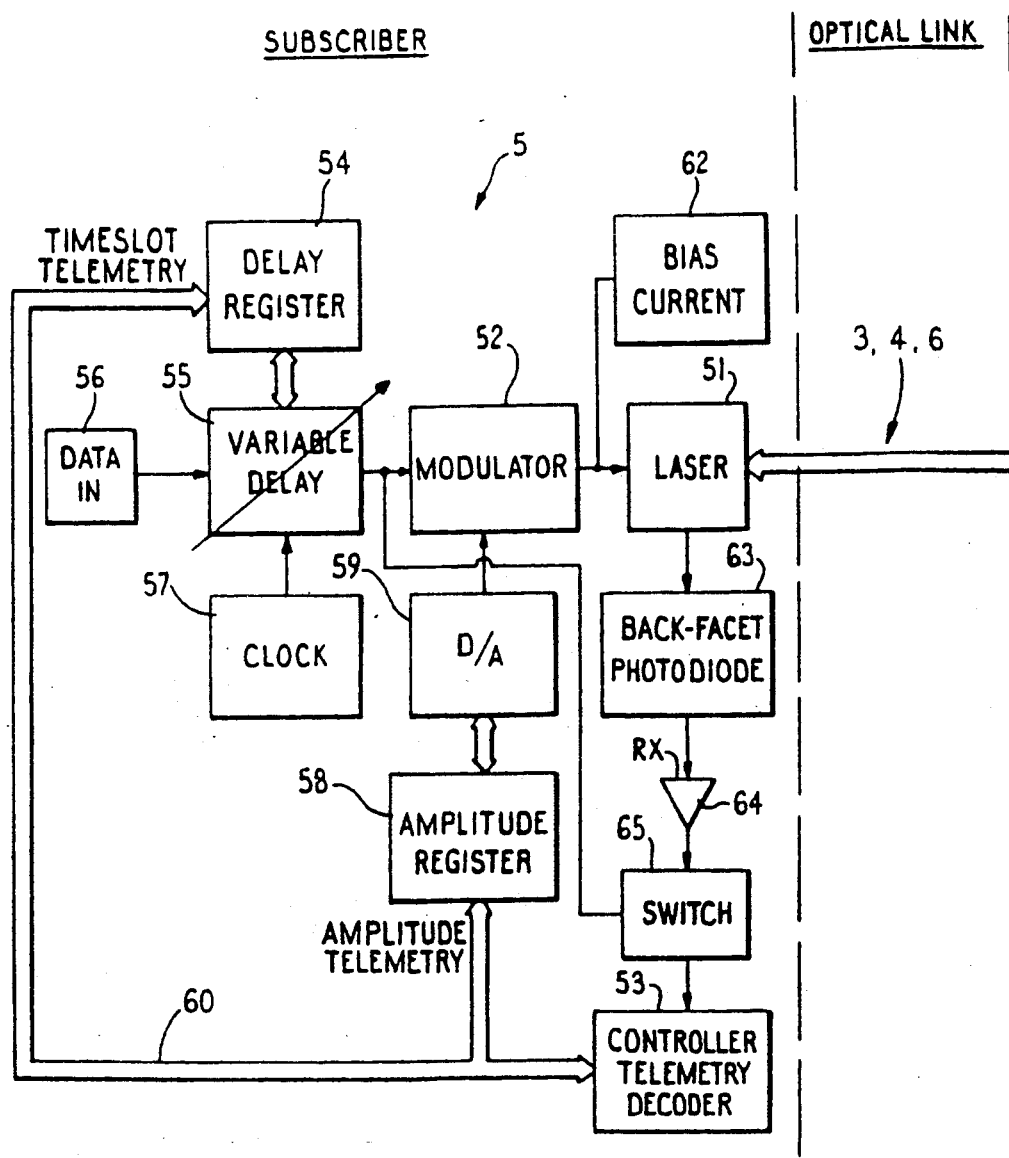
FIG. 5 is a schematic diagram of an embodiment of a transmitter/receiver (transceiver) according to the present invention for use with the control system of FIG. 4 in which a laser back facet diode is the detector.

Referring now to FIG. 5, there is shown the optical link and subscriber sections of the network of FIG. 4 in which the laser 51 is arranged to operate as both a transmitter and a receiver.

A bias current supply 62 supplies a bias current to the laser 51 sufficient to forward bias it below the lasing threshold to act as a laser amplifier when no data signal is supplied by the modulator 52. Optical signals arriving from the network 3, 4, 6 are amplified as they pass through the laser diode 51 and fall on the laser diode's back facet photodiode 63 which acts as an optical detector. The output from the photodiode 63 is applied to the amplifier 64. A switch 65 is arranged so that the amplifier 64 is connected to the controller-telemetry decoder 53 only when no signal is being output from the variable delay 55, i.e. when the subscriber is in receive mode. The decoder 53 acts on received signals as it does in the arrangement of FIG. 4.

The laser 51 operates in transmit mode as described above with reference to FIG. 4. The current from the modulator 52 will be less than before because of the effect of the bias current supply but will be controlled in the same manner to fix the laser output.

The laser 51 in the transceiver of FIG. 5 is permanently forward biased in receive mode and so requires only a change in bias current amplitude to take it above threshold to cause it to lase and enter the transmit mode. Because the laser 51 operates in a low duty cycle mode and is always forward biased, recovery time problems are minimised when changing between the receive and transmit modes of laser operation. The laser transmit mode is only required for one time slot out of many and one can afford to lose a timeslot each side of that time slot as the laser transfers to receive mode without affecting the received signal.

If it is found not necessary to gate out the receiver 72 during the transmit bursts in a particular network the switch 82 may be omitted and the receiver 64 permanently connected to the decoder 53.

Figure 6:
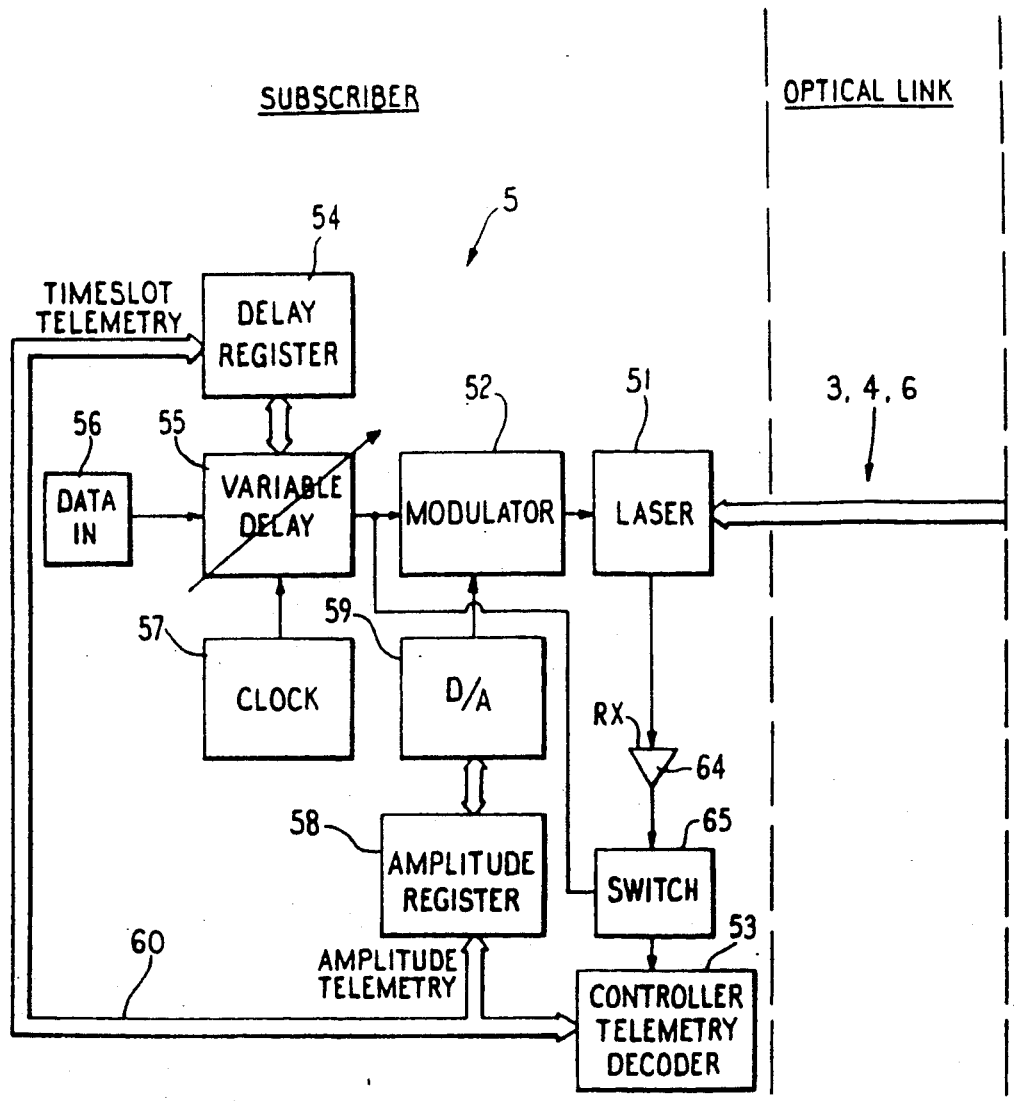
FIG. 6 is a schematic diagram of a second embodiment of a transceiver according to the present invention in which the laser is the optical detector.

Other arrangements in which the transmitter is also used as a receiver are possible. Referring to FIG. 6 the laser diode 51 as unbiased in receive mode with the back-facet photodiode being used as in FIG. 5 to detect unamplified signals from the network. The laser diode 51 is considered a passive part of the optical detector guiding light to the photodiode.

In yet another arrangement the laser diode 51 itself may be connected to the amplifier 64 so it acts as detector itself. In such an arrangement other opto-electronic devices may be used to serve as both transmitters and receivers, for example light emitting diodes.

We claim:

1. A method for controlling the signal from each outstation in a time division multiplex (TDM) optical network, including a multiple access passive optical network having a central node and a plurality of outstations, the method comprising, at the central node:
   monitoring the temporal position of the signal from an outstation in a TDM time slot allocated to that outstation relative to a predetermined discrimination value to detect the signal,
   further monitoring the value of the temporal position from the outstation relative to predetermined first and second referenced values defining a range of acceptable values for the temporal position; and
   if the value of the temporal position for a detected signal falls outside the range, transmitting a control signal to instruct the relevant outstation to alter the value of the temporal position as required to bring the value into the acceptable range for subsequent signals originating from that outstation.

2. A method according to claim 1 including selecting the first and second reference values to define a central region within the total duration of the time slot.

3. A method according to claim 1 further comprising:
   monitoring signal amplitude and controlling it with feedback from the central node; and
   combining the monitoring of the temporal position and the amplitude relative to their respective discrimination values into a signal monitoring step by monitoring the amplitude of the signal relative to the amplitude discrimination value at the time corresponding to the temporal position discrimination value.

4. A method for controlling a signal from an outstation in a multiple access passive optical network including a central node and a plurality of outstations, the method comprising, at the central node:
   monitoring the value of a parameter of the signal from the outstation relative to predetermined discrimination value to detect the signal,
   further monitoring the value of the parameter of the signal from the outstation relative to predetermined first and second reference values defining a range of acceptable values for the parameter;
   if the value of the parameter for a detected signal falls outside the range, transmitting a control signal to instruct the relevant outstation to alter the value of the parameter as required to bring the value into the acceptable range for subsequent signals originating from that outstation, and
   recording alterations in the value of the monitored parameter over a period, checking for a consistent trend in the recorded alterations symptomatic of an abnormal condition and indicating when such a trend is recognised.

5. A control system for a TDM network in a multiple access passive optical network having a central node and a plurality of outstations, a signal control system comprising:
   decision means for detecting the signal from an outstation and monitoring the value of the temporal position of the signal from an outstation in a TDM time slot allocated to that outstation
   first and second monitoring means for monitoring the signal position with respect to the time slot allocated to each particular signal by comparing the signal position relative to predetermined first and second respective reference values defining a range of acceptable values for signal position;
   control means for identifying the outstation sending the signal and,
   if the value of the signal position for a detected signal falls outside the said range, for transmitting a control signal specific to that outstation, the control signal carrying instructions to the outstation to alter the signal position as required to bring it into the acceptable range for subsequent signals originating from that outstation; and
   in an outstation, decoding means for identifying a control signal specific to the outstation and signal control means responsive to the control signal for altering the value of the monitored signal position as instructed.

6. A control system according to claim 5 wherein:
the decision means also monitors the signal amplitude relative to a decision threshold for detecting the signal,
the monitoring means monitors the signal amplitude relative to two further amplitude levels defining an acceptable amplitude range above the decision threshold, and
the decision means for monitoring the temporal position and the amplitude relative to their respective discrimination values are combined into a single dual purpose decision means adapted to monitor the amplitude of the signal relative to the amplitude discrimination value at the time corresponding to the temporal position discrimination value.

7. A control system in a multiple access passive optical network including a central node and a plurality of outstations, said control system comprising:
decision means for detecting the signal from an outstation and monitoring the value of parameter of the signal relative to a predetermined discrimination value;
first and second monitoring means for comparing the value of the parameter relative to predetermined first and second respective reference value defining a range of acceptable values for the parameter;
control means for identifying the outstation sending the signal and if the value or the parameter for a detected signal falls outside the said range, the control signal carrying instructions to the outstation to alter the value of the parameter as required to bring the value into the acceptable range for subsequent signals originating from that outstation;
in an outstation, decoding means for identifying a control signal specific to the outstation and signal control means responsive to the control signal for altering the value of the monitored parameter as instructed, and
means for recognising the occurrence of a consistent trend in the alteration of a monitored parameter symptomatic of an abnormal condition and means for indicating when such a trend is recognised.

8. A method for controlling the transmission of signal pulses from an outstation in a time division multiplex multiple access passive optical network including a central node and a plurality of outstations, the method comprising, at the central node, the steps of:
detecting relative to a predetermined discrimination value the presence or absence of a received signal pulse at the central position of a time slow allocated to that outstation,
detecting relative to said predetermined discrimination value the presence or absence of a received signal pulse at first and second predetermined times which define a central region within the total duration of the time slot,
determining from combinatorial logic function of said detections whether that outstation needs to correct the timing of the transmission of the signal pulses, and,
if so, transmitting a control signal to instruct that outstation to alter said timing for subsequent transmission from that outstation.

9. A method according to claim 8, including the further steps of:
further detecting at said central position the amplitude of a received signal relative to first and second reference values defining a range of acceptable values for the amplitude,
determining from combinatoral logic function of said detections at said central position whether that outstation needs to correct the amplitude of the transmission of the signal pulses, and
if so, transmitting a control signal to instruct that outstation to alter the amplitude of subsequent transmission from that outstation.

10. A method according to claim 8 or 9 including the further steps at the central node of:
noting over a period, for each instance of instructing an outstation to make an alteration, whether the instruction is an increment or a decrement,
recognising in accordance with a predetermined criterion whether the noted increments or decrements are symptomatic of an abnormal condition, and
indicating the recognition of such a condition.

11. In a time division multiplex multiple access passive optical network including a central node and a plurality of outstations, a control system for controlling the transmission of signal pulses from the outstations, the system comprising:
in the central node,
first detecting means for detecting relative to a predetermined discrimination value the presence or absence of a received signal pulse at the central position of a time slot allocated to a particular outstation,
second detection means for detecting relative to said predetermined discrimination value the presence or absence of a received signal pulse at first and second predetermined times which define a central region within the total duration of the time slot, and
determination means responsive to said first and second detection means for determining from combinatorial logic function of the detections whether that particular outstation needs to correct the timing of the transmission of the signal pulses, and for generating for transmission a control signal to instruct that particular outstation to alter said timing for subsequent transmission from that particular outstation; and
in an outstation,
means for identifying a control signal specific to that particular outstation, and
signal control means responsive to the control signal for altering the timing for subsequent transmission as instructed.

12. A control system according to claim 11, further comprising:
third detection means for detecting at the central position of a time slot the amplitude of a received signal relative to first and second reference values defining a range of acceptable values for the amplitude;
wherein said determination means is also responsive to said third detection means for determining from combinatorial logic function of the detections whether that particular outstation needs to correct the amplitude of the transmission of the signal pulses, and for generating for transmission a further control signal to instruct that particular outstation to alter the amplitude of subsequent transmission from that outstation; and wherein said signal control means is also responsive to the further control signal for altering the amplitude of subsequent transmission as instructed.

13. A transceiver as claimed in claim 12 including a laser bias supply whereby the laser diode is forward biased to act as a laser amplifier when not in transmitting mode.

14. A transceiver as claimed in claim 12 including a switch means arranged to connect the optical detector to the decoding means only when the optical transmitter is not transmitting.

15. A control system according to claim 11 or 12 in which said first and said second detection means comprise respective bistable flip-flops arranged to latch the logical state representative of said detected presence or absence at said central position and at said first and second predetermined times, respectively.

16. A control system according to claim 11 or 12 further comprising means for noting, over a period, for each instance of instructing an outstation to make an alteration, whether the instruction is an increment or a decrement, for recognising in accordance with a predetermined criterion whether the noted increments or decrements are symptomatic of an abnormal condition, and for indicating the recognition of such a condition.

17. A transceiver for use in an outstation of a control system as claimed in 11, said transceiver comprising a laser diode optical transmitter having a back-facet photodiode which forms at least part of an optical detector for detecting, in use, control signals from the central node.

18. A method for controlling a time division multiplex (TDM) multiple access optical network having a central node in bi-directional TDM optical communication with a plurality of outstations, said method comprising the steps of:
monitoring, at the central node, the temporal position of signals received from an outstation within a TDM time slot allocated to that station; and
transmitting from the central node to said outstation a control signal which causes the temporal position of signals thereafter emanating from the outstation to change if required to maintain the monitored temporal position within a predetermined range of acceptable limits.

19. A method as in claim 18 further comprising:
monitoring, at the central node, the amplitude of signals received from an outstation within a TDM time slot allocated to that station; and
transmitting from the central node to said outstation, as part of said control signal, an amplitude control signal which causes the amplitude of signals thereafter emanating from the outstation to change if required to maintain the monitored amplitude within a predetermined range of acceptable amplitude limits.

20. A method as in claim 18 or 19 further comprising:
monitoring a cumulative parameter change effected by said control signal over a time period and using such cumulative change to detect an abnormal control condition.

21. A method as in claim 18 or 19 further comprising:
using a back-facet photodiode in a transceiver laser diode at said outstations to detect said control signal.

22. An apparatus for controlling a time division multiplex (TDM) multiple access optical network having a central node in bi-directional TDM optical communication with a plurality of outstations, said apparatus comprising:
means for monitoring at the central nodes, the temporal position of signals received from an outstation within a TDM time slot allocated to that station; and
means for transmitting from the central node to said outstation a control signal which causes the temporal position of signals thereafter emanating from the outstation to change if required to maintain the monitored temporal position within a predetermined range of acceptable limits.

23. An apparatus as in claim 22 further comprising:
means for monitoring, at the central node, the amplitude of signals received from an outstation within a TDM time slot allocated to that station; and
means for transmitting from the central node to said outstation as part of said control station an amplitude control signal which causes the amplitude of signals thereafter emanating from the outstation to change if required to maintain the monitored amplitude within a predetermined range of acceptable amplitude limits.

24. An apparatus as in claim 22 or 23 further comprising:
means for monitoring a cumulative parameter change effected by said control signal over a time period and using such cumulative change to detect an abnormal control condition.

25. An apparatus as in claim 22 or 23 further comprising:
a back-facet photodiode in a transceiver laser diode at said outstations to detect said control signal.

* * * * *